(12) United States Patent
Kang et al.

(10) Patent No.: US 10,089,066 B2
(45) Date of Patent: Oct. 2, 2018

(54) ELECTRONIC APPARATUS AND AUDIO OUTPUT APPARATUS COMPOSING AUDIO OUTPUT SYSTEM, AND CONTROL METHOD THEREOF

(71) Applicant: SAMSUNG ELECTRONICS CO., LTD., Suwon-si (KR)

(72) Inventors: Jeong-won Kang, Seoul (KR); Chang-seog Ko, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/637,643

(22) Filed: Jun. 29, 2017

(65) Prior Publication Data

US 2018/0165054 A1 Jun. 14, 2018

(30) Foreign Application Priority Data

Dec. 13, 2016 (KR) ........................ 10-2016-0169876

(51) Int. Cl.
*H04R 29/00* (2006.01)
*G06F 3/16* (2006.01)
*H04N 5/60* (2006.01)
*H04R 1/20* (2006.01)
*H04R 5/04* (2006.01)
(Continued)

(52) U.S. Cl.
CPC .............. *G06F 3/165* (2013.01); *H04N 5/60* (2013.01); *H04R 1/20* (2013.01); *H04R 1/40* (2013.01); *H04R 3/12* (2013.01); *H04R 5/04* (2013.01)

(58) Field of Classification Search
CPC ....................................................... H04R 29/00
See application file for complete search history.

(56) References Cited

U.S. PATENT DOCUMENTS

2004/0071294 A1* 4/2004 Halgas, Jr. ........... H04B 5/0006
381/59
2009/0323991 A1* 12/2009 Hudson ..................... H04S 7/00
381/303
(Continued)

FOREIGN PATENT DOCUMENTS

GB 2528034 A 1/2016
JP 2011-4077 A 1/2011
(Continued)

*Primary Examiner* — Olisa Anwah
(74) *Attorney, Agent, or Firm* — Sughrue Mion, PLLC

(57) ABSTRACT

An electronic apparatus of an audio output system is provided. The electronic apparatus includes: a first communicator configured to transmit a first radio signal and receive a first response signal; a second communicator configured to transmit a second radio signal and receive a second response signal; and a processor configured to: determine a first distance between the first communicator and an audio output apparatus based on the first response signal, determine a second distance between the second communicator and the audio output apparatus based on the second response signal, determine a location of the audio output apparatus based on the first distance and the second distance; establish a communication connection with the audio output apparatus based on one from among the first response signal and the second response signal; and set a channel of the audio output apparatus based on the determined location of the audio output apparatus.

20 Claims, 9 Drawing Sheets

(51) Int. Cl.
   *H04R 3/12*   (2006.01)
   *H04R 1/40*   (2006.01)

(56) References Cited

U.S. PATENT DOCUMENTS

| | | | | |
|---|---|---|---|---|
| 2010/0188212 | A1* | 7/2010 | Jochelson | H04R 5/02 340/540 |
| 2013/0022204 | A1* | 1/2013 | Adhikari | H04S 7/302 381/17 |
| 2014/0219483 | A1* | 8/2014 | Hong | H04R 5/02 381/307 |
| 2017/0099558 | A1* | 4/2017 | Spitznagle | G06F 3/0481 |
| 2017/0230753 | A1* | 8/2017 | Friedlander | H04R 5/04 |

FOREIGN PATENT DOCUMENTS

| | | |
|---|---|---|
| KR | 10-2006-0061656 A | 6/2006 |
| KR | 10-2014-0099122 A | 8/2014 |
| KR | 10-2016-0011124 A | 1/2016 |

* cited by examiner

ELECTRONIC APPARATUS AND AUDIO OUTPUT APPARATUS COMPOSING AUDIO OUTPUT SYSTEM, AND CONTROL METHOD THEREOF

CROSS-REFERENCE TO RELATED APPLICATION

This application claims priority from Korean Patent Application No. 10-2016-0169876, filed on Dec. 13, 2016 in the Korean Intellectual Property Office, the disclosure of which is incorporated herein by reference in its entirety.

BACKGROUND

Field

Apparatuses and methods consistent with exemplary embodiments relate to an electronic apparatus and an audio output apparatus composing an audio output system, and a control method thereof, and more particularly, to an electronic apparatus and an audio output apparatus which are able to output audio signals to an external speaker, and a control method thereof.

Related Art

With recent enhancement of electronic technology, various kinds of electronic apparatuses have been developed and distributed. In particular, various kinds of electronic apparatuses that include display devices are increasingly used throughout households. For example, home theater systems include audio output systems which enable users to feel a sense of depth and increased realism in their homes by using images of high quality audio resources. Such audio resources may be provided over multiple audio channels.

Many home theater systems include a plurality of speakers at specific locations to increase a stereo effect. In the case of a 5.1 channel setup, the plurality of speakers may include directional speakers, such as a front left (L) speaker, a front right (R) speaker, a center speaker, a rear L speaker, a rear R speaker, and a sub-woofer.

However, when an existing home theater system is installed, it is difficult for users to distinguish between speakers, and to know where the speakers should be located and how the speakers should be arranged. Accordingly, the users must refer to a manual or manually set channels for each of the speakers. In addition, when the home theater system is not in use, the speakers may be stored in one place. In this case, in order to arrange the speakers for use in the home theater system, the user must distinguish between the speakers and set the channels of the speakers every time the speakers are arranged, which causes inconvenience to the users.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an electronic apparatus which can automatically set a channel of an audio output apparatus in an audio output system, an audio output apparatus, and a control method thereof.

According to an aspect of an exemplary embodiment, there is provided an electronic apparatus including: a first communicator configured to transmit a first radio signal and receive a first response signal; a second communicator configured to transmit a second radio signal and receive a second response signal; and a processor configured to: determine a first distance between the first communicator and an audio output apparatus based on the first response signal, determine a second distance between the second communicator and the audio output apparatus based on the second response signal, determine a location of the audio output apparatus based on the first distance and the second distance; establish a communication connection with the audio output apparatus based on one from among the first response signal and the second response signal; and set a channel of the audio output apparatus based on the location of the audio output apparatus that is determined.

The processor may be further configured to: determine the first distance based on a first time difference between a time at which the first radio signal is transmitted and a time at which the first response is received; determine the second distance based on a second time difference between a time at which the second radio signal is transmitted and a time at which the second response signal is received; and determine the location of the audio output apparatus based on the first distance, the second distance and a distance between the first communicator and the second communicator.

The first response signal may include information regarding a time at which the audio output apparatus receives the first radio signal, the second response signal may include information regarding a time at which the audio output apparatus receives the second radio signal, and the processor may be further configured to determine the location of the audio output apparatus based on the first distance, the second distance, a first time difference between a time at which the first radio signal is generated and a time at which the audio output apparatus receives the first radio signal, and a second time difference between a time at which the second radio signal is generated and a time at which the audio output apparatus receives the second radio signal.

The audio output apparatus may be one of a plurality of audio output apparatuses, and the processor may be further configured to: control the first communicator and the second communicator to communicate with each of the plurality of audio output apparatuses; determine relative locations of each of the plurality of audio output apparatuses based on received corresponding response signals; and set a channel of each of the plurality of audio output apparatuses based on the relative locations.

The processor may be further configured to transmit, to the audio output apparatus, a control signal for adjusting an output level of the audio output apparatus based on the location of the audio output apparatus.

The first communicator and the second communicator may be configured to communicate according to a Bluetooth communication method.

The electronic apparatus may further include a storage configured to store information regarding a plurality of target locations respectively corresponding to of a plurality of audio output apparatuses and channels corresponding to the target locations, and the processor may be further configured to set a channel corresponding to a closest target location to the audio output apparatus as the channel of the audio output apparatus based on the information stored in the storage.

The channel of the audio output apparatus may include a channel corresponding to at least one from among a front speaker, a rear speaker, a center speaker, and a sub-woofer.

According to an aspect of another exemplary embodiment, there is provided a control method of an electronic apparatus, the control method including: transmitting a first radio signal via a first communicator; transmitting a second radio signal via a second communicator; receiving a first response signal via the first communicator; receiving a second response signal via the second communicator; determining a first distance between the first communicator and an audio output apparatus based on the first response signal; determining a second distance between the second communicator and the audio output apparatus based on the second response signal; determining a location of the audio output apparatus based on the first distance and the second distance; establishing a communication connection using one from among the first response signal and the second response signal; and setting a channel of the audio output apparatus based on the location of the audio output apparatus.

The determining the first distance may include determining the first distance based on a first time difference between a time at which the first radio signal is transmitted and a time at which the first response signal is received, the determining the second distance may include determining the second distance based on a second time difference between a time at which the second radio signal is transmitted and a time at which the second response signal is received, and the determining the location of the audio output apparatus may include determining the location of the audio output apparatus based on the first distance, the second distance, and a distance between the first communicator and the second communicator.

The first response signal may include information regarding a time at which the audio output apparatus receives the first radio signal, the second response signal may include information regarding a time at which the audio output apparatus receives the second radio signal, and the determining the location may include determining the location of the audio output apparatus based on the first distance, the second distance, a first time difference between a time at which the first radio signal is generated and a time at which the audio output apparatus receives the first radio signal, and a second time difference between a time at which the second radio signal is generated and a time at which the audio output apparatus receives the second radio signal.

The audio output apparatus may be one of a plurality of audio output apparatuses, the receiving may include receiving response signals from each of the plurality of audio output apparatuses, the determining the location may include determining relative locations of each of the plurality of audio output apparatuses based on response signals received from the plurality of audio output apparatuses, and the setting may include setting a channel of each of the plurality of audio output apparatuses based on the relative locations.

The control method may further include transmitting, to the audio output apparatus, a control signal for adjusting an output level of the audio output apparatus based on the location of the audio output apparatus.

The first communicator and the second communicator may be configured to communicate according to a Bluetooth communication method.

The setting may include setting the channel corresponding to a closest target location to the audio output apparatus as the channel of the audio output apparatus using pre-stored information regarding target locations of a plurality of audio output apparatuses and channels corresponding to the target locations.

The channel of the audio output apparatus may include a channel corresponding to at least one from among a front speaker, a rear speaker, a center speaker, and a sub-woofer.

According to an aspect of yet another exemplary embodiment, there is provided an audio output apparatus including: an audio outputter; a communicator configured to receive a first radio signal and a second radio signal from an electronic apparatus; and a processor configured to: transmit a first response signal responding to the first radio signal and a second response signal responding to the second radio signal to the electronic apparatus; establish a communication connection with the electronic apparatus using at least one from among the first response signal and the second response signal; and set a channel of audio to be output through the audio outputter based on location information of the audio output apparatus received from the electronic apparatus.

The processor may be further configured to adjust an output level based on the location information of the audio output apparatus.

The communicator may be further configured to communicate according to a Bluetooth communication method.

The processor may be further configured to receive, from the electronic apparatus, information regarding a plurality of target locations of a plurality of audio output apparatuses and a plurality of channels respectively corresponding to the plurality of target locations, and set a channel of the plurality of channels corresponding to a closest target location to the audio output apparatus, of the plurality of target locations, as the channel of audio to be output through the audio outputter.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will become more apparent from the following description of exemplary embodiments, with reference to the accompanying drawings, in which.

DETAILED DESCRIPTION OF EXEMPLARY EMBODIMENTS

Figure 1:
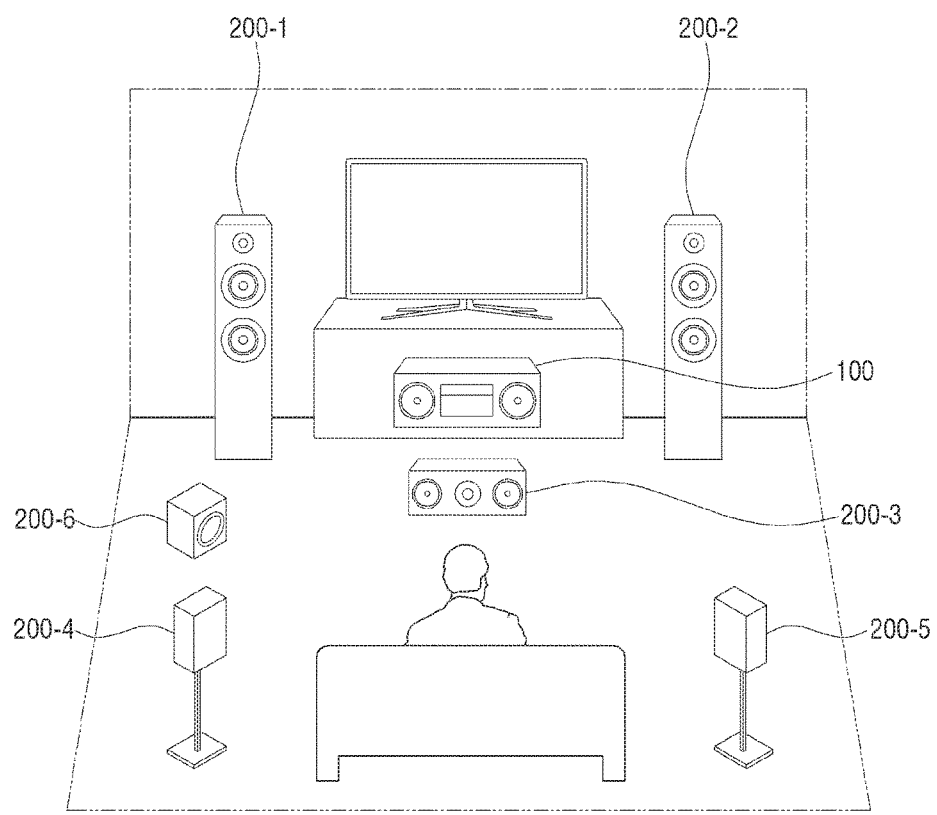
FIG. 1 is a view showing a configuration of an audio output system according to an exemplary embodiment.

Exemplary embodiments will now be described with reference to the accompanying drawings in detail.

Exemplary embodiments of the present disclosure may be diversely modified. Aspects of exemplary embodiments are illustrated in the drawings and are described in detail in the detailed description. However, it is to be understood that the present disclosure is not limited to the specific exemplary embodiments discussed herein, but includes all modifications, equivalents, and substitutions without departing from the scope and spirit of the present disclosure. Also, well-known functions or constructions are not described in detail since they would obscure the disclosure with unnecessary detail.

First, the terms used in the specification and the claims are normal terms which are selected in consideration of the functions in various exemplary embodiments. However, the terms may be changed according to an intention or a legal or technical interpretation of a person skilled in the art and the advent of new technology. In addition, some terms may be arbitrarily selected by the applicant. These terms may be interpreted as defined in the present specification and may be interpreted based on the present specification and typical common knowledge of the relevant technical field unless defined otherwise.

In addition, the same reference numerals or signs described in the attached drawings indicate components or elements performing the substantially same functions. In other exemplary embodiments, the same reference numerals or signs may be used for convenience of easy explanation and understanding. That is, even if plural drawings illustrate all of the elements having the same reference numerals, the plural drawings do not represent one exemplary embodiment.

In addition, terms including ordinal numbers such as "first" and "second" may be used to distinguish between elements in the specification and the claims. The ordinal numbers may be used to distinguish between the same or similar elements and should not be interpreted as limiting the meanings of the terms by the use of the ordinal numbers. For example, elements combined with the ordinal numbers should not be interpreted as limiting using order or arrangement order by the numbers. The ordinal numbers may be used interchangeably when necessary.

As used herein, the singular forms are intended to include the plural forms as well, unless the context clearly indicates otherwise. The terms "comprise," "have," "include" or "compose" indicate the presence of features, numbers, steps, operations, elements, and components described in the specification, or a combination thereof, and do not preclude the presence or addition of one or more other features, numbers, steps, operation, elements, or components, or a combination thereof.

In exemplary embodiments, the terms "module," "unit," or "part" are used to indicate an element performing at least one function or operation, and the element may be implemented by using hardware or software, or may be implemented by using a combination of hardware and software. In addition, a plurality of "modules," "units," or "parts" may be integrated into one or more modules, and may be implemented by one or more processors.

It will be understood that when an element is connected with another element, the element may be directly connected with another element, and there may be an intervening element between the element and another element. In addition, it will be understood that when a part includes an element, the part does not exclude other elements and may further include other elements unless they are defined otherwise.

Hereinafter, exemplary embodiments will be described in detail with reference to the accompanying drawings.

FIG. 1 is a view showing a configuration of an audio output system according to an exemplary embodiment.

The audio output system 1000 according to an exemplary embodiment may be implemented by using an electronic apparatus 100 and an audio output apparatus 200. As shown in FIG. 1, the audio output system 1000 may be implemented by using a home theater system.

Specifically, in the home theater system, the electronic apparatus 100 may be implemented by using a media reproduction apparatus, and the audio output apparatus 200 may be implemented by using a surround speaker. For example, as shown in FIG. 1, the audio output apparatus 200 may include six speakers in total, having different channels, that is, a front L speaker 200-1, a front R speaker 200-2, a center speaker 200-3, a rear L speaker 200-4, a rear R speaker 200-5, and a sub-woofer 200-6. According to an exemplary embodiment, the audio output apparatus 200 may be implemented by using less or more than six speakers having different channels.

The speakers should be arranged at appropriate locations according to their respective functions. For example, the front speakers 200-1 and 200-2 may be arranged at both sides of a television (TV) or a screen which is placed in front of a user, and the center speaker 200-3 may be arranged at the center between the front speakers 200-1 and 200-2.

According to an exemplary embodiment, the audio output system 1000 may be implemented as a home network system capable of two-way communication by connecting the electronic apparatus 100 and the plurality of audio output apparatuses 200-1 to 200-6 as a single system using wireless communication. However, this should not be considered as limiting as long as the audio output system 1000 is a system which has a plurality of apparatuses connected with one another through a network and controls the apparatuses.

In this case, the electronic apparatus 100 may be implemented to communicate with a gateway apparatus, a network server, a controller apparatus, or the like or to be provided with a function of the gateway apparatus, the network server, the controller apparatus, or the like, and may control the overall operations of a plurality of devices in the network system.

Meanwhile, when arranging the audio output apparatuses of the audio output system 1000, normal users may have difficulty in knowing where the audio output apparatuses 200-1 to 200-6 should be arranged with reference to the location of the electronic apparatus 100. In particular, when the audio output apparatuses 200-1 to 200-6 have similar appearances, it is difficult for the users to distinguish the audio output apparatuses 200-1 to 200-6 from one another. According to the present disclosure, the electronic apparatus 100 may calculate the locations of the audio output apparatuses 200-1 to 200-6 based on triangulation through radio signals such as Bluetooth signals or the like, and may automatically set channels of the audio output apparatuses 200-1 to 200-6 (channels corresponding to the front speakers, the rear speakers, the center speaker, and the subwoofer) for implementing a surround effect of 5.1 channels, based on the calculated locations.

Accordingly, the electronic apparatus 100 according to an exemplary embodiment may be implemented by using an apparatus which is provided with at least two communicators and outputs different radio signals, and may determine the locations of the audio output apparatuses 200-1 to 200-6 based on triangulation according to a process of receiving radio signals from the audio output apparatuses 200-1 to 200-6 placed nearby, may set the channels of the audio output apparatuses 200-1 to 200-6 based on the determined locations, and may provide various services related to the determined locations.

Figure 2:
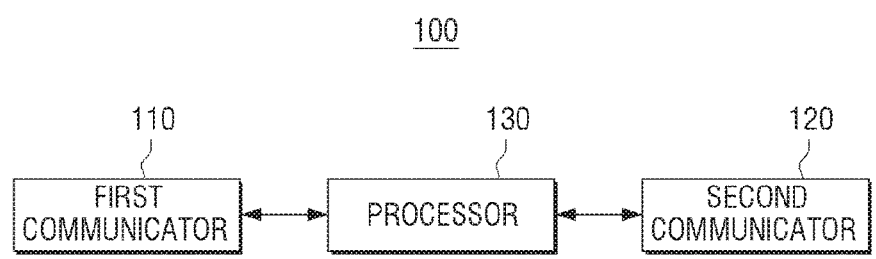
FIG. 2 is a block diagram schematically showing a configuration of an electronic apparatus according to an exemplary embodiment.

FIG. 2 is a block diagram schematically showing a configuration of an electronic apparatus according to an exemplary embodiment.

Referring to FIG. 2, the electronic apparatus 100 may include a first communicator 110, a second communicator 120, and a processor 130.

The first communicator 110 and the second communicator 120 communicate with the audio output apparatus 200. Herein, each of the first communicator 110 and the second communicator 120 may be a transceiver (transmitter and receiver) or communication interface that communicates with the audio output apparatus 200 through radio signals according to various wireless communication methods such as Bluetooth (BT), Wireless Fidelity (Wi-Fi), Zigbee, near field communication (NFC), or the like.

Specifically, in response to a predetermined event occurring, the first communicator 110 and the second communicator 120 may transmit signals to the audio output apparatus 200 according to a pre-defined communication method. For example, in response to the electronic apparatus 100 and the audio output apparatus 200 communicating with each other according to the Bluetooth communication method, the first communicator 110 and the second communicator 120 may transmit Bluetooth signals for searching the audio output apparatus 200 around the electronic apparatus 100. In this case, a signal transmitted from the first communicator 110 is referred to as a first Bluetooth signal and a signal transmitted from the second communicator 120 is referred to as a second Bluetooth signal.

The first communicator 110 and the second communicator 120 may be implemented to be able to perform bidirectional communication with the audio output apparatus 200. In response to response signals to the first and the second Bluetooth signals being received from the audio output apparatus 200 which has received the first and the second Bluetooth signals, the electronic apparatus 100 may enter an interworking state with the audio output apparatus 200 by means of at least one of the first communicator 110 and the second communicator 120 which has received the response signals. Herein, the interworking state may refer to any state in which communication is possible like an operation of initializing communication between the electronic apparatus 100 and the audio output apparatus 200, an operation of forming a network, and an operation of performing device pairing. In response to the electronic apparatus 100 and the audio output apparatus 200 performing communication in the Bluetooth communication method, the response signals transmitted from the audio output apparatus 200 may include device identification information such as a pin code of the audio output apparatus 200, and accordingly, pairing may be performed between the electronic apparatus 100 and the audio output apparatus 200.

The first Bluetooth signal and the second Bluetooth signal may include identification information regarding the first communicator 110 and the second communicator 120 to be distinguished from each other, and may use different frequency bands.

Hereinafter, an exemplary embodiment in which the electronic apparatus 100 and the audio output apparatus 200 perform communication through Bluetooth signals according to the Bluetooth communication method will be described for convenience of explanation. However, it is obvious that the radio signals are not limited to the Bluetooth signals and include radio signals according to various communication methods such as Wi-Fi, Zigbee, NFC, or the like as described above.

The first communicator 110 and the second communicator 120 may be configured to be spaced from each other by a predetermined distance. For example, the first communicator 110 and the second communicator 120 may be embedded in the right end and the left end of the electronic apparatus 100, but this should not be considered as limiting. For example, the first communicator 110 and the second communicator 120 may be implemented by using independent devices connected with the electronic apparatus 100 in a wire or wireless manner. In this case, the electronic apparatus 100 may know the locations of the first communicator 110 and the second communicator 120.

The processor 130 may be configured to control the overall operation of the electronic apparatus 100.

In response to the response signals to the first and the second Bluetooth signals being received from the audio output apparatus 200, which has received the first and the second Bluetooth signals, through the first communicator 110 and the second communicator 120, the processor 130 may determine the location of the audio output apparatus 200 based on a distance between the first communicator 110 and the second communicator 120 and the received response signals.

Specifically, the audio output apparatus 200 may receive the Bluetooth signals, and, in response to the first and the second Bluetooth signals output from the electronic apparatus 100 being received, the audio output apparatus 200 may transmit first and second response signals to the first and the second Bluetooth signals. In this case, the response signals may be transmitted after a predetermined time since the Bluetooth signals have been received, and may include identification information on the audio output apparatus 200.

In response to the response signals being received by the electronic apparatus 100, the processor 130 may calculate a time difference between the time at which the first communicator 110 transmits the first Bluetooth signal and the time at which the first response signal is received in response to the first Bluetooth signal, and may calculate a distance between the first communicator 110 and the audio output apparatus 200 based on a speed value of the Bluetooth signals. In addition, the processor 130 may calculate a time difference between the time at which the second communicator 120 transmits the second Bluetooth signal and the time at which the second response signal is received in response to the second Bluetooth signal, and may calculate a distance between the second communicator 120 and the audio output apparatus 200.

The processor 130 may determine the relative location of the audio output apparatus 200 to the electronic apparatus 100 according to triangulation using the distance between the first communicator 110 and the audio output apparatus 200, the distance between the second communicator 120 and the audio output apparatus 200, and the distance between the first communicator 110 and the second communicator 120.

According to another exemplary embodiment of measuring the distances among the first communicator 110, the second communicator 120, and the audio output apparatus 200, the response signals received by the electronic apparatus 100 from the audio output apparatus 200 may include information regarding the time at which the audio output apparatus 200 receives the first and the second Bluetooth signals. In this case, the processor 130 may calculate a time difference between the time at which the first communicator 110 transmits the first Bluetooth signal and the time at which the audio output apparatus 200 receives the first Bluetooth signal, and may calculate a distance between the first communicator 110 and the audio output apparatus 200 based on a speed value of the Bluetooth signal. In addition, the processor 130 may calculate a time difference between the time at which the second communicator 120 transmits the second Bluetooth signal and the time at which the audio output apparatus 200 receives the second Bluetooth signal, and may also calculate a distance between the second communicator 120 and the audio output apparatus 200.

In response to the location of the audio output apparatus 200 being determined, the processor 130 may connect communication with the audio output apparatus 200 using one of the first and the second response signals, and may set a channel of the audio output apparatus 200 based on the determined location of the audio output apparatus 200. For example, in response to the electronic apparatus 100 and the audio output apparatus 200 communicating with each other according to the Bluetooth communication method, the processor 130 may perform pairing with the audio output apparatus 200 using at least one of the first and the second Bluetooth signals.

Specifically, the processor 130 may differently set channels of the plurality of audio output apparatuses based on the relative locations of the plurality of audio output apparatuses which are determined with reference to the electronic apparatus 100.

In order to set a location of a predetermined range around the electronic apparatus 100 to a specific channel, the electronic apparatus 100 may use information showing that a location of a specific range around the electronic apparatus 100 and a channel are mapped onto each other. That is, a location of a predetermined range around the electronic apparatus 100 may be mapped onto a channel, and the electronic apparatus 100 may designate the location of the predetermined range around the electronic apparatus 100 as a target location of the audio output apparatus 200. Accordingly, the electronic apparatus 100 may further include a storage 140 to store information on target locations of the plurality of audio output apparatuses and channels corresponding to the target locations.

The processor 130 may set a channel corresponding to the closest target location to the audio output apparatus 200 as the channel of the audio output apparatus 200 based on the stored information.

According to another exemplary embodiment, the processor 130 may determine the relative locations between the plurality of audio output apparatuses based on the response signals received from the plurality of audio output apparatuses, and may differently set channels of the plurality of audio output apparatuses based on the determined relative locations.

That is, the processor 130 may determine directions and distances of other audio output apparatuses with reference to at least one audio output apparatus, and accordingly, may calculate relative locations of the audio output apparatuses and may set channels according to the calculated relative locations. For example, an audio output apparatus which is implemented by using a front L speaker may be arranged at a location spaced from an audio output apparatus implemented by using a front R speaker in a leftward direction by a predetermined distance, and may be arranged at a location spaced from an audio output apparatus implemented by using a rear L speaker in a forward direction by a predetermined distance. According to the relative locations, the processor 130 may set channels of the respective audio output apparatuses.

Figure 3:
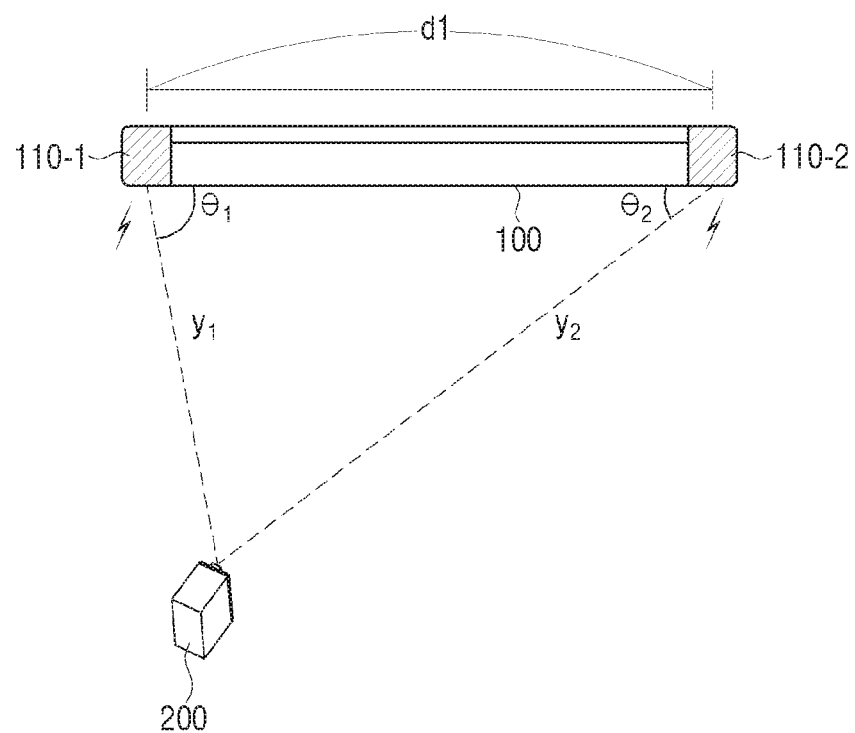
FIG. 3 is a view to illustrate a method for determining a location of an audio output apparatus according to an exemplary embodiment.

FIG. 3 is a view to illustrate a method for determining a location of an audio output apparatus according to an exemplary embodiment.

Referring to FIG. 3, the processor 130 may calculate a distance $y_1$ to the audio output apparatus 200 from the first communicator 110 based on a time difference $t_1$ between the time at which the first communicator 110 outputs the first Bluetooth signal and the time at which the first response signal to the first Bluetooth signal is received, and a speed $v_b$ of the Bluetooth signals. For example, the distance $y_1$ may equal $t_1/2*v_b$. In addition, the processor 130 may calculate a distance $y_2$ to the audio output apparatus 200 from the second communicator 120 based on a time difference $t_2$ between the time at which the second communicator 120 outputs the second Bluetooth signal and the time at which the second response signal to the second Bluetooth signal is received, and a speed $v_b$ of the Bluetooth signals. For example, the distance $y_2$ may equal $t_2/2*v_b$.

According to another exemplary embodiment, the processor 130 may determine a distance to the audio output apparatus 200 based on the strength of response signals received from the audio output apparatus 200. That is, since the strength of Bluetooth signals is reduced in inverse proportion to a distance, the first communicator 110 and the second communicator 120 may measure received signal strength indication (RSSI) values of the response signals received from the audio output apparatus 200, and may determine a distance to the audio output apparatus 200 according to the measured RSSI values. In this case, the electronic apparatus 100 may further include a storage 140 to store a table in which RSSI values and distances corresponding to the RSSI values are matched with each other, and may determine a distance to the audio output apparatus 200 using the stored table. The processor 130 may calculate the distance $y_1$ to the audio output apparatus 200 from the first communicator 110 using the strength of the first response signal received at the first communicator 110, and may calculate the distance $y_2$ to the audio output apparatus 200 from the second communicator 120 using the strength of the second response signal received at the second communicator 120.

However, the electronic apparatus 100 may transmit only the Bluetooth signal of one of the first communicator 110 and the second communicator 120, and the audio output apparatus 200 may transmit only one response signal to the received Bluetooth signal. The first communicator 110 and the second communicator 120 may calculate the distances $y_1$ and $y_2$ to the audio output apparatus 200 using the strength of the received one response signal.

In response to the distances $y_1$ and $y_2$ being calculated, the horizontal position of the audio output apparatus 200 may be calculated by triangulation. That is, in response to a distance $d_1$ between the first communicator 110 and the second communicator 120 being known information, and the distance $y_1$ between the first communicator 110 and the audio output apparatus 200, and the distance $y_2$ between the second communicator 120 and the audio output apparatus 200 being calculated, three elements of a triangle (lengths of the three sides) may be determined, and accordingly, the processor 130 may determine the horizontal position of the audio output apparatus 200.

The response signal may include information related to the time at which the first and the second Bluetooth signals are received. In this case, the processor 130 may calculate times required for the first and the second Bluetooth signals to arrive at the audio output apparatus 200 based on the time difference between the time at which the first and the second Bluetooth signals are transmitted and the time at which the first and the second Bluetooth signals are received, and may calculate the distances between the first communicator 110 and the second communicator 120 and the audio output apparatus 200 using the information on the calculated times and the speed information of the Bluetooth signals.

Figure 4:
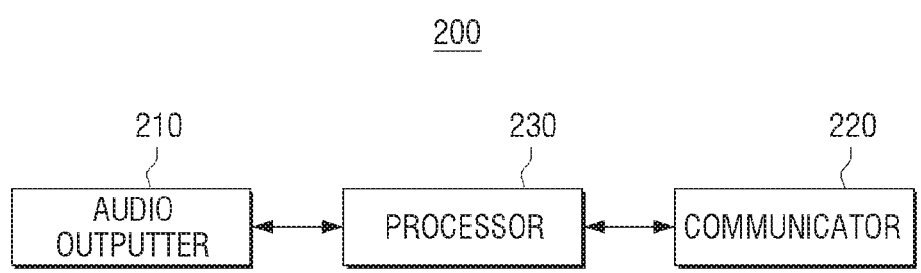
FIG. 4 is a block diagram schematically showing a configuration of an audio output apparatus according to an exemplary embodiment.

FIG. 4 is a block diagram schematically showing a configuration of an audio output apparatus according to an exemplary embodiment.

Referring to FIG. 4, the audio output apparatus 200 includes an audio outputter 210, a communicator 220, and a processor 230.

The audio outputter 210 is configured to output an audio signal through a set channel according to a pitch of the output audio signal. Specifically, the channel of the audio output apparatus 200 may include different channels corresponding to audio output functions of a front L speaker, a front R speaker, a rear L speaker, a rear R speaker, a center speaker, a sub-woofer, and the like.

The communicator 220 is configured to receive first and second Bluetooth signals transmitted from the electronic apparatus 100. In response to the first and the second Bluetooth signals being received, the communicator 220 may transmit response signals corresponding thereto, and accordingly, may perform pairing with the electronic apparatus 100 according to one of the first and the second Bluetooth signals.

The processor 230 is configured to control the overall operation of the audio output apparatus 200.

The processor 230 may control to transmit the response signals to the first and the second Bluetooth signals to the electronic apparatus 100 through the communicator 220, and, in response to pairing being performed with the electronic apparatus 100, the processor 230 may set a channel of an audio to be output through the audio outputter 210 based on information on the location of the audio output apparatus 200, which is received from the electronic apparatus 100.

Specifically, the processor 230 may receive, from the electronic apparatus 100, information on target locations where the plurality of audio output apparatuses 200 should be arranged, and channels corresponding to the target locations, and may set a channel corresponding to the closest target location to the audio output apparatus 200 as the channel of the audio to be output through the audio outputter 210, based on the received information. However, the audio output apparatus 200 may further include a storage to store the information on the target locations of the audio output apparatuses 200 and the channels corresponding to the target locations. The processor 230 may search the closest target location to the current location of the audio output apparatus 200 based on the stored information and the location information received from the electronic apparatus 100, and may set to output the audio through the channel corresponding to the searched target location.

According to another exemplary embodiment, the electronic apparatus 100 may determine the location of the audio output apparatus 200 and may transmit, to the audio output apparatus 200, a control signal for setting a channel of the audio output apparatus 200 according to the determined location. In this case, the processor 230 may set the channel of the audio output apparatus 200 according to the received control signal.

Figure 5:
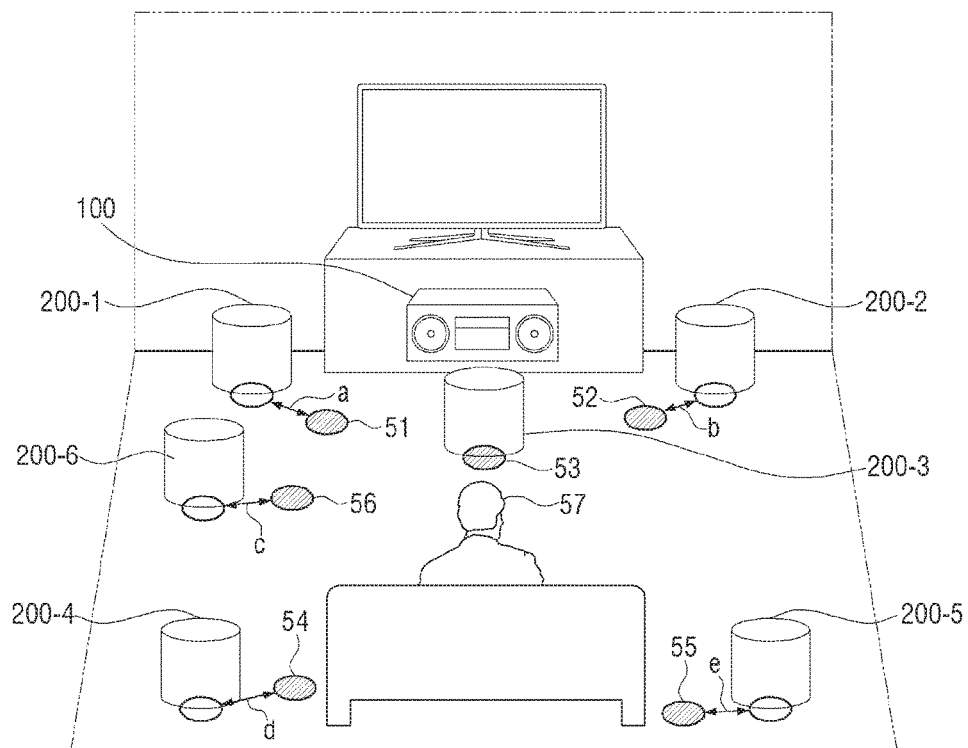
FIG. 5 is a view to illustrate a method for changing an output level according to a distance of an audio output apparatus to a target location according to an exemplary embodiment.

FIG. 5 is a view to illustrate a method for changing an output level according to a distance of an audio output apparatus to a target location according to an exemplary embodiment.

According to an exemplary embodiment, the processor 130 of the electronic apparatus 100 may control to transmit, to the audio output apparatus 200, a control signal for adjusting an output level of the audio output apparatus 200 based on the determined location of the audio output apparatus 200. For example, the processor 130 may transmit, to the audio output apparatus 200, a control signal for increasing the output level of the audio output apparatus 200 in proportion to a distance to the location of the audio output apparatus 200 from a predetermined location. Herein, the predetermined location may be a user's location and the processor 130 may estimate the user's location with reference to the location of each audio output apparatus 200.

Referring to FIG. 5, in the audio output system 1000, the electronic apparatus 100 may store information on a range of appropriate locations where the audio output apparatuses should be arranged, that is, information on target locations 51-56. Referring to FIG. 5, even when the user arranges the audio output apparatuses 200-1 to 200-6 without distinguishing them from one another, the electronic apparatus 100 may automatically set channels corresponding to the closest target locations to the audio output apparatuses 200-1 to 200-6 as channels of the audio output apparatuses 200-1 to 200-6 based on mapping information stored in the electronic apparatus 100. However, even when the user can arrange the audio output apparatuses 200-1 to 200-6 close to the target locations 51-56, it is difficult to exactly arrange the audio output apparatuses 200-1 to 200-6 at the target locations 51-56. As shown in FIG. 5, the audio output apparatus 200-3 corresponding to the center may be appropriately arranged at the target location 53, but the audio output apparatuses 200-1, 200-2, 200-4, 200-5, 200-6 corresponding to the front L speaker, the front R speaker, the rear L speaker, the rear R speaker, and the sub-woofer may be arranged spaced from the closest locations 51, 52, 54, 55, and 56 by distances a, b, c, d, and e, respectively.

Accordingly, it is necessary to adjust the output levels of the audio output apparatuses 200-1 to 200-6 such that the user can listen to the best audio as when the audio output apparatuses 200-1 to 200-6 are appropriately arranged at the target locations.

The processor 130 may adjust the output levels of the audio output apparatuses 200-1 to 200-6 based on the distances (a-e) from the current locations of the audio output apparatuses 200-1, 200-2, 200-4, 200-5, and 200-6 to the closest target locations 51, 52, 54, 55, and 56. The output level may be adjusted according to a distance to the target location and a direction. For example, when the audio output apparatus is arranged far away from a user location 57, the processor 130 may control the output level of the audio output apparatus to increase. To the contrary, when the audio output apparatus is arranged close to the user location 57, the processor 130 may control the output level of the audio output apparatus to be reduced.

Figure 6:
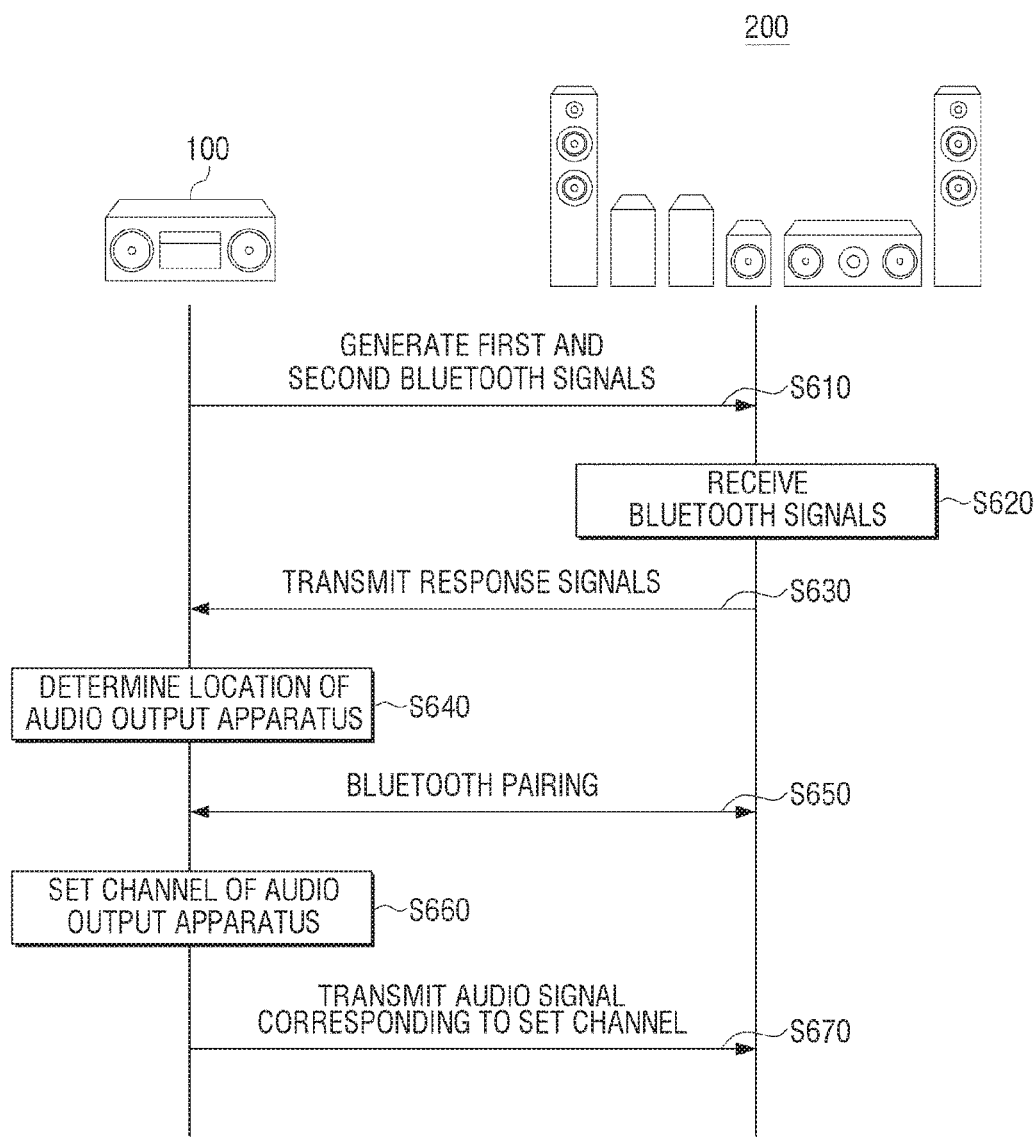
FIG. 6 is a sequence diagram to illustrate an interaction between an electronic apparatus and a plurality of audio output apparatuses according to an exemplary embodiment.

FIG. 6 is a sequence diagram to illustrate an interaction between an electronic apparatus and a plurality of audio output apparatuses according to an exemplary embodiment.

First, in response to first and second Bluetooth signals being transmitted by the electronic apparatus 100 simultaneously (S610), the plurality of audio output apparatuses 200 receive the first and the second Bluetooth signals (S620). The audio output apparatuses transmit response signals to the first and the second Bluetooth signals (S630), and the electronic apparatus 100 which has received the response signals may determine the respective locations of the plurality of audio output apparatuses 200 based on information on times at which the response signals are received (S640). The electronic apparatus 100 and the plurality of audio output apparatuses 200 may perform pairing using the first Bluetooth signal or the second Bluetooth signal (S650). However, the pairing operation in step S650 may precede step S640. In response to the pairing operation being completed, the electronic apparatus 100 may set different channels according to the respective locations of the plurality of audio output apparatuses 200 (S660). However, the channel setting operation in step S660 may precede the Bluetooth pairing operation in step S650. The electronic apparatus 100 may transmit, to the plurality of audio output apparatuses 200, control signals for controlling the plurality of audio output apparatuses 200 to operate at the set channels (S670).

Figure 7:
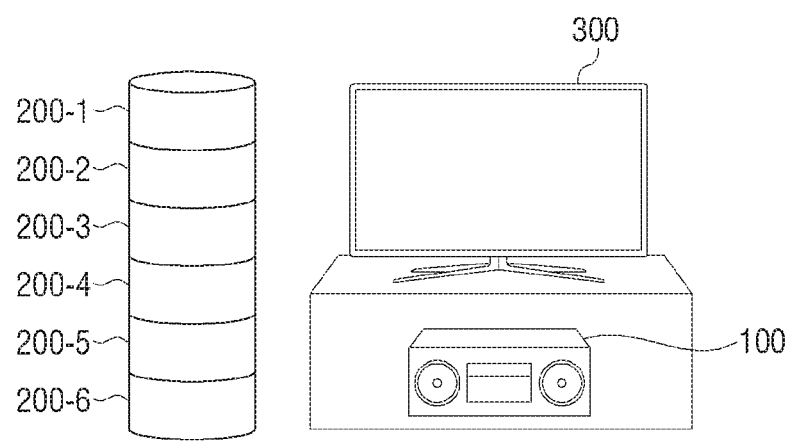
FIG. 7 is a view to illustrate a method for arranging audio output apparatuses when they are not in use according to an exemplary embodiment.

FIG. 7 is a view to illustrate a method for arranging when audio output apparatuses are not in use according to an exemplary embodiment.

Referring to FIG. 7, a plurality of audio output apparatuses 200-1 to 200-6 may have similar shapes and may be implemented in a dock structure to be connected with one another. Accordingly, when the audio output system 1000 is not in use, the user may bind the audio output apparatuses 200-1 to 200-6 to one another to keep or charge them in the proximity of the electronic apparatus 100 and a TV 300 as shown in FIG. 7, and may unbind the audio output apparatuses 200-1 to 200-6 from one another and arrange them only when the audio output system 1000 is in use. Therefore, it is easy to arrange the audio output apparatuses 200-1 to 200-6. In this case, the user may arrange the audio output apparatuses 200-1 to 200-6 without distinguishing them from one another, and the electronic apparatus 100 may automatically set channels according to the locations of the audio output apparatuses 200-1 to 200-6.

Figure 8:
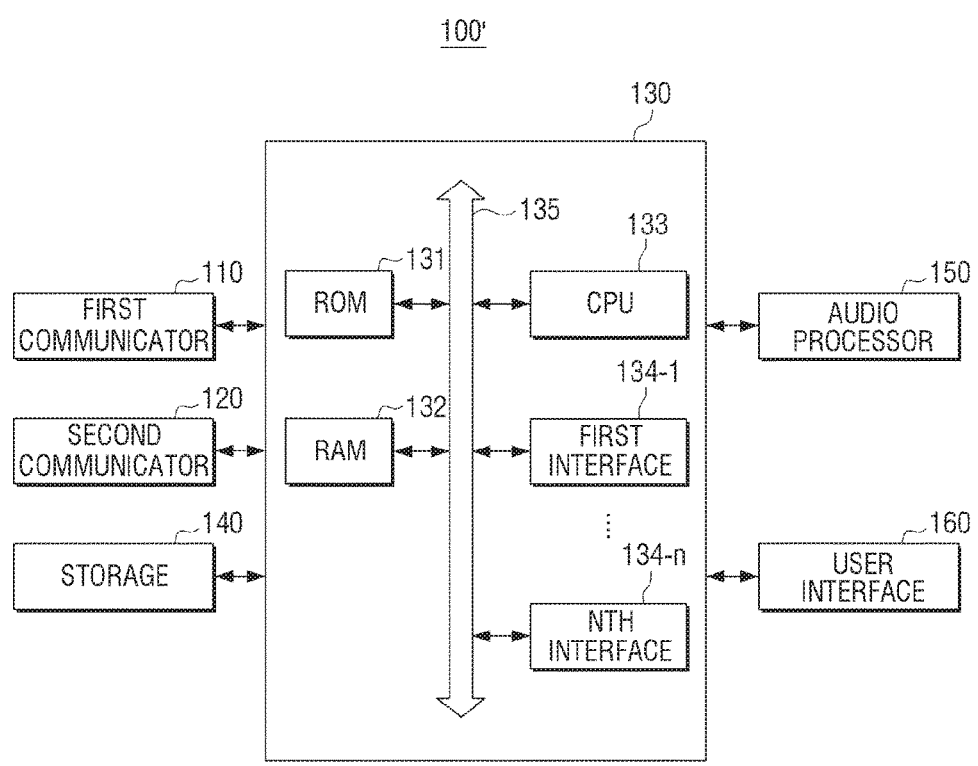
FIG. 8 is a block diagram illustrating a configuration of an electronic apparatus in detail according to another exemplary embodiment.

FIG. 8 is a block diagram showing a configuration of an electronic apparatus in detail according to another exemplary embodiment.

FIG. 8 is a block diagram illustrating the detailed configuration of the electronic apparatus shown in FIG. 2. Referring to FIG. 8, the electronic apparatus 100' includes a first communicator 110, a second communicator 120, a processor 130, a storage 140, an audio processor 150, and a user interface 160. From among the components shown in FIG. 8, the same components as those illustrated in FIG. 2 will not be described in detail since they have been described in FIG. 2.

The processor 130 controls the overall operation of the electronic apparatus 100'. Specifically, the processor 130 may include a read only memory (ROM) 131, a random access memory (RAM) 132, a central processing unit 133, first to n-th interfaces 134-1 to 134-n, and a bus 135.

The ROM 131, the RAM 132, the CPU 133, and the first to the n-th interfaces 134-1 to 134-n may be connected with one another via the bus 135.

The first to the n-th interfaces 134-1 to 134-n are connected with the above-described various components. One of the interfaces may be a network interface which is connected with an external device via a network.

The CPU 133 may access the storage 140 to boot using an operating system (O/S) stored in the storage 140. In addition, the CPU 133 may perform various operations using various programs, contents, data, or the like stored in the storage 140.

The ROM 131 stores a set of commands for booting a system. In response to a turn-on command being inputted and power being supplied, the CPU 133 may boot a system by executing the 0/S stored in the storage 140 according to a command stored in the ROM 131.

The RAM 132 is a main memory device of the processor 130 and may be used to load the 0/S or a program executed in the 0/S or to temporarily store data. In response to booting being completed, the CPU 133 may copy various application programs stored in the storage 140 into the RAM 132, and may perform various operations by executing the application programs copied into the RAM 132.

The first to the n-th interfaces 134-1 to 134-n are connected with the above-described components. One of the interfaces may be a network interface which is connected with an external device via a network.

The operation of the above-described processor 130 may be performed by a program stored in the storage 140.

The storage 140 may store an O/S software module for driving the electronic apparatus 100' and various data such as various multimedia contents. In particular, the storage 140 may store programs such as a communication module for providing various communication functions, a signal processing module, a location calculation module, and a UI providing module.

The processor 130 may transmit a signal to the audio output apparatus 200 using the communication module. For example, the processor 130 may receive, from the audio output apparatus 200, a response signal or a signal including time information regarding time at which a Bluetooth signal is received, using the communication module.

The processor 130 may process the response signal received from the audio output apparatus 200 or process a signal to be transmitted to the audio output apparatus 200 using the signal processing module.

In addition, the processor 130 may calculate the location of the audio output apparatus 200, for example, a distance and a direction of the audio output apparatus 200 from the electronic apparatus 100, based on a value processed through the signal processing module, by using the location calculation module.

In addition, the electronic apparatus 100' may further include the audio processor 150 to process audio data, and the user interface 160 including a camera, a microphone, and a remote control signal receiver to perform various interactions with the user.

Figure 9:
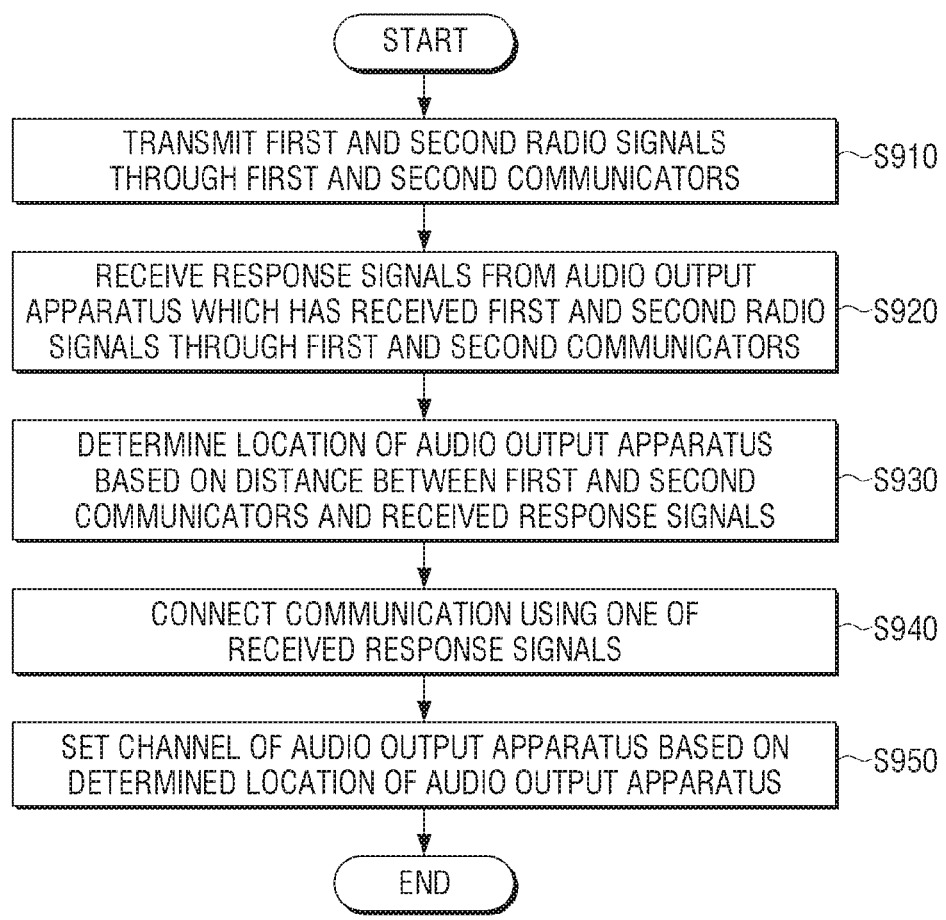
FIG. 9 is a flowchart to illustrate a control method of an electronic apparatus according to an exemplary embodiment.

FIG. 9 is a flowchart to illustrate a control method of an electronic apparatus according to an exemplary embodiment.

First, a first radio signal and a second radio signal are transmitted through the first and the second communicators according to a predetermined wireless communication method (S910).

Thereafter, from the audio output apparatus which has received the first and the second radio signals, response signals to the first and the second radio signals are received through the first and the second communicators (S920). In this case, the channel of the audio output apparatuses may include a channel corresponding to at least one of a front speaker, a rear speaker, a center speaker, and a sub-woofer for implementing a surround effect of 5.1 channels.

Thereafter, the location of the audio output apparatus is determined based on a distance between the first and the second communicators and the received response signals (S930). In this case, distances between the first and the second communicators and the audio output apparatus may be determined based on a time difference between the time at which the first and the second radio signals are generated and the time at which the response signals are received at the first and the second communicators, and the relative location of the audio output apparatus to the electronic apparatus may be determined based on the determined distances and the distance between the first and the second communicators.

In addition, the response signals may include information regarding the time at which the audio output apparatuses receive the first and the second radio signals. In this case, the location of the audio output apparatus may be determined based on the distance between the first and the second communicators and the difference between the time at which the first and the second radio signals are generated and the time at which the audio output apparatus receives the first and the second radio signals.

In response to the response signals to the first and the second radio signals being received from the plurality of audio output apparatuses, the relative locations of the plurality of audio output apparatuses may be determined based on the response signals received from the plurality of audio output apparatuses.

Thereafter, a communication connection is established using at least one of the received response signals (S940).

Thereafter, a channel of the audio output apparatus may be set based on the determined location of the audio output apparatus (S950). In this case, a channel corresponding to the closest target location to the audio output apparatus may be set as the channel of the audio output apparatus by using pre-stored information regarding the target locations of the plurality of audio output apparatuses and channels corresponding to the target locations.

In response to the relative locations of the plurality of audio output apparatuses being determined based on the response signals received from the plurality of audio output apparatuses, channels of the plurality of audio output apparatuses may be differently set based on the relative locations of the plurality of audio output apparatuses.

In addition, a control signal for adjusting an output level of the audio output apparatus based on the determined location of the audio output apparatus may be transmitted to the audio output apparatus. In this case, a control signal for increasing the output level of the audio output apparatus in proportion to a distance to the audio output apparatus from a predetermined location may be transmitted to the audio output apparatus.

According to various exemplary embodiments described above, normal users can easily and conveniently arrange speakers in a home theater system.

The control method of the electronic apparatus according to the above-described various exemplary embodiments may be implemented by using a program and may be stored in various recording media. That is, a computer program which is processed by various processors and executes the above-described control methods may be stored in a recording medium and used.

For example, a non-transitory computer readable medium storing a program, which performs the steps of: transmitting a first Bluetooth signal and a second Bluetooth signal via a first communicator and a second communicator; receiving, from an audio output apparatus which has received the first and the second Bluetooth signals, response signals to the first and the second radio signals via the first and the second communicators; determining a location of the audio output apparatus based on a distance between the first and the second communicators and the received response signals; performing pairing using one of the received response signals; and setting a channel of the audio output apparatus based on the determined location of the audio output apparatus, may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. An electronic apparatus comprising:
   a first communicator configured to transmit a first radio signal and receive a first response signal;
   a second communicator configured to transmit a second radio signal and receive a second response signal; and
   a processor configured to:
      in response to response signals to the first and the second radio signals being received from an audio output apparatus, which has received the first and the second radio signals, via the first and the second communicators, determine a location of the audio output apparatus based on a distance between the first and the second communicators and the received response signals;
      establish a communication connection with the audio output apparatus based on one from among the first response signal and the second response signal; and
      set a channel of the audio output apparatus based on the location of the audio output apparatus that is determined.

2. The electronic apparatus of claim 1, wherein the processor is further configured to:
   determine a first distance between the first communicator and the audio output apparatus based on a first time difference between a time at which the first radio signal is transmitted and a time at which the first response signal is received,
   determine a second distance between the second communicator and the audio output apparatus based on a second time difference between a time at which the second radio signal is transmitted and a time at which the second response signal is received, and
   determine the location of the audio output apparatus based on the first distance, the second distance, and the distance between the first communicator and the second communicator.

3. The electronic apparatus of claim 2, wherein the first response signal comprises information regarding a time at which the audio output apparatus receives the first radio signal,
wherein the second response signal comprises information regarding a time at which the audio output apparatus receives the second radio signal, and
wherein the processor is further configured to determine the location of the audio output apparatus based on the first distance, the second distance, a first time difference between a time at which the first radio signal is generated and a time at which the audio output apparatus receives the first radio signal, and a second time difference between a time at which the second radio signal is generated and a time at which the audio output apparatus receives the second radio signal.

4. The electronic apparatus of claim 1, wherein the audio output apparatus is one of a plurality of audio output apparatuses, and
wherein the processor is further configured to:
control the first communicator and the second communicator to communicate with each of the plurality of audio output apparatuses,
determine relative locations of each of the plurality of audio output apparatuses based on received corresponding response signals, and
set a channel of each of the plurality of audio output apparatuses based on the relative locations.

5. The electronic apparatus of claim 1, wherein the processor is further configured to transmit, to the audio output apparatus, a control signal for adjusting an output level of the audio output apparatus based on the location of the audio output apparatus.

6. The electronic apparatus of claim 1, wherein the first communicator and the second communicator are configured to communicate according to a Bluetooth communication method.

7. The electronic apparatus of claim 1, further comprising a storage configured to store information regarding a plurality of target locations respectively corresponding to of a plurality of audio output apparatuses and channels corresponding to the target locations, and
wherein the processor is further configured to set a channel corresponding to a closest target location to the audio output apparatus as the channel of the audio output apparatus based on the information stored in the storage.

8. The electronic apparatus of claim 1, wherein the channel of the audio output apparatus comprises a channel corresponding to at least one from among a front speaker, a rear speaker, a center speaker, and a sub-woofer.

9. A control method of an electronic apparatus, the control method comprising:
transmitting a first radio signal via a first communicator;
transmitting a second radio signal via a second communicator;
receiving a first response signal via the first communicator;
receiving, from an audio output apparatus which has received the second radio signal, a second response signal via the second communicator;
determining a location of the audio output apparatus based on a distance between the first and the second communicators and the received response signals;
establishing a communication connection using one from among the first response signal and the second response signal; and
setting a channel of the audio output apparatus based on the location of the audio output apparatus.

10. The control method of claim 9, wherein the determining the location comprises:
determining a first distance between the first communicator and the audio output apparatus based on a first time difference between a time at which the first radio signal is transmitted and a time at which the first response signal is received,
determining a second distance between the second communicator and the audio output apparatus based on a second time difference between a time at which the second radio signal is transmitted and a time at which the second response signal is received, and
wherein the determining the location of the audio output apparatus comprises determining the location of the audio output apparatus based on the first distance, the second distance, and the distance between the first communicator and the second communicator.

11. The control method of claim 10, wherein the first response signal comprises information regarding a time at which the audio output apparatus receives the first radio signal,
wherein the second response signal comprises information regarding a time at which the audio output apparatus receives the second radio signal, and
wherein the determining the location comprises determining the location of the audio output apparatus based on the first distance, the second distance, a first time difference between a time at which the first radio signal is generated and a time at which the audio output apparatus receives the first radio signal, and a second time difference between a time at which the second radio signal is generated and a time at which the audio output apparatus receives the second radio signal.

12. The control method of claim 9, wherein the audio output apparatus is one of a plurality of audio output apparatuses,
wherein the receiving comprises receiving response signals from each of the plurality of audio output apparatuses,
wherein the determining the location comprises determining relative locations of each of the plurality of audio output apparatuses based on response signals received from the plurality of audio output apparatuses, and
wherein the setting comprises setting a channel of each of the plurality of audio output apparatuses based on the relative locations.

13. The control method of claim 9, further comprising transmitting, to the audio output apparatus, a control signal for adjusting an output level of the audio output apparatus based on the location of the audio output apparatus.

14. The control method of claim 9, wherein the first communicator and the second communicator are configured to communicate according to a Bluetooth communication method.

15. The control method of claim 9, wherein the setting comprises setting the channel corresponding to a closest target location to the audio output apparatus as the channel of the audio output apparatus using pre-stored information regarding target locations of a plurality of audio output apparatuses and channels corresponding to the target locations.

16. The control method of claim 9, wherein the channel of the audio output apparatus comprises a channel corresponding to at least one from among a front speaker, a rear speaker, a center speaker, and a sub-woofer.

17. A speaker comprising:
an audio outputter;
a communicator configured to receive a first radio signal and a second radio signal from an electronic apparatus; and
a processor configured to: transmit a first response signal responding to the first radio signal and a second response signal responding to the second radio signal to the electronic apparatus; establish a communication connection with the electronic apparatus using at least one from among the first response signal and the second response signal; and set a channel of audio to be output through the audio outputter based on location information of the audio output apparatus received from the electronic apparatus.

18. The speaker of claim 17, wherein the processor is further configured to adjust an output level based on the location information of the audio output apparatus.

19. The speaker of claim 17, wherein the communicator is further configured to communicate according to a Bluetooth communication method.

20. The speaker of claim 17, wherein the processor is further configured to receive, from the electronic apparatus, information regarding a plurality of target locations of a plurality of audio output apparatuses and a plurality of channels respectively corresponding to the plurality of target locations, and set a channel of the plurality of channels corresponding to a closest target location to the audio output apparatus, of the plurality of target locations, as the channel of audio to be output through the audio outputter.

* * * * *